United States Patent

Tensor

[11] Patent Number: 5,885,514
[45] Date of Patent: Mar. 23, 1999

[54] AMBIENT UVL-CURABLE ELASTOMER MOLD APPARATUS

[75] Inventor: Paul M. Tensor, Lombard, Ill.

[73] Assignee: Dana Corporation, Toledo, Ohio

[21] Appl. No.: 761,516

[22] Filed: Dec. 9, 1996

[51] Int. Cl.⁶ .................................................. B29C 35/08
[52] U.S. Cl. .......................... 264/478; 264/496; 264/266; 264/259; 425/174.4; 425/121; 425/116
[58] Field of Search ..................... 264/478, 496, 264/494, 266, 259; 425/174.4, 121, 116

[56] References Cited

U.S. PATENT DOCUMENTS

| | | | |
|---|---|---|---|
| 3,867,222 | 2/1975 | Plant et al. | 156/107 |
| 4,247,510 | 1/1981 | Desverchere | 264/236 |
| 4,380,613 | 4/1983 | Nativi | 525/440 |
| 4,432,832 | 2/1984 | Fantone | 156/630 |
| 4,619,804 | 10/1986 | Leonard et al. | 264/220 |
| 4,635,947 | 1/1987 | Hatayama | 277/235 A |
| 4,675,346 | 6/1987 | Lin et al. | 522/39 |
| 4,681,800 | 7/1987 | Zerfass et al. | 428/283 |
| 4,822,434 | 4/1989 | Sawaki et al. | 156/48 |
| 5,116,558 | 5/1992 | Wrobel et al. | 264/46.6 |
| 5,332,536 | 7/1994 | Boeckeler | 264/22 |
| 5,340,847 | 8/1994 | Hanazuka et al. | 522/11 |
| 5,510,152 | 4/1996 | Boldt | 427/510 |

FOREIGN PATENT DOCUMENTS 0446040A 9/1991 European Pat. Off. .

Primary Examiner—Jan H. Silbaugh
Assistant Examiner—Suzanne E. Mason
Attorney, Agent, or Firm—Rader, Fishman & Grauer PLLC

[57] ABSTRACT

An improved process for molding parts such as gaskets using an injection molding machine including upper and lower mold plates which are transparent to UV light and have pattern recesses of differing sizes and spaced apart locations, a UV light source, and a low pressure injection system for delivering elastomers to the mold plates. The elastomers are cured by exposure to UV light. An optional carrier plate may be inserted between the mold plates and provides a rigid surface for attachment of the elastomer. The carrier plate selectively covers the pattern recesses located in the mold plates.

19 Claims, 1 Drawing Sheet

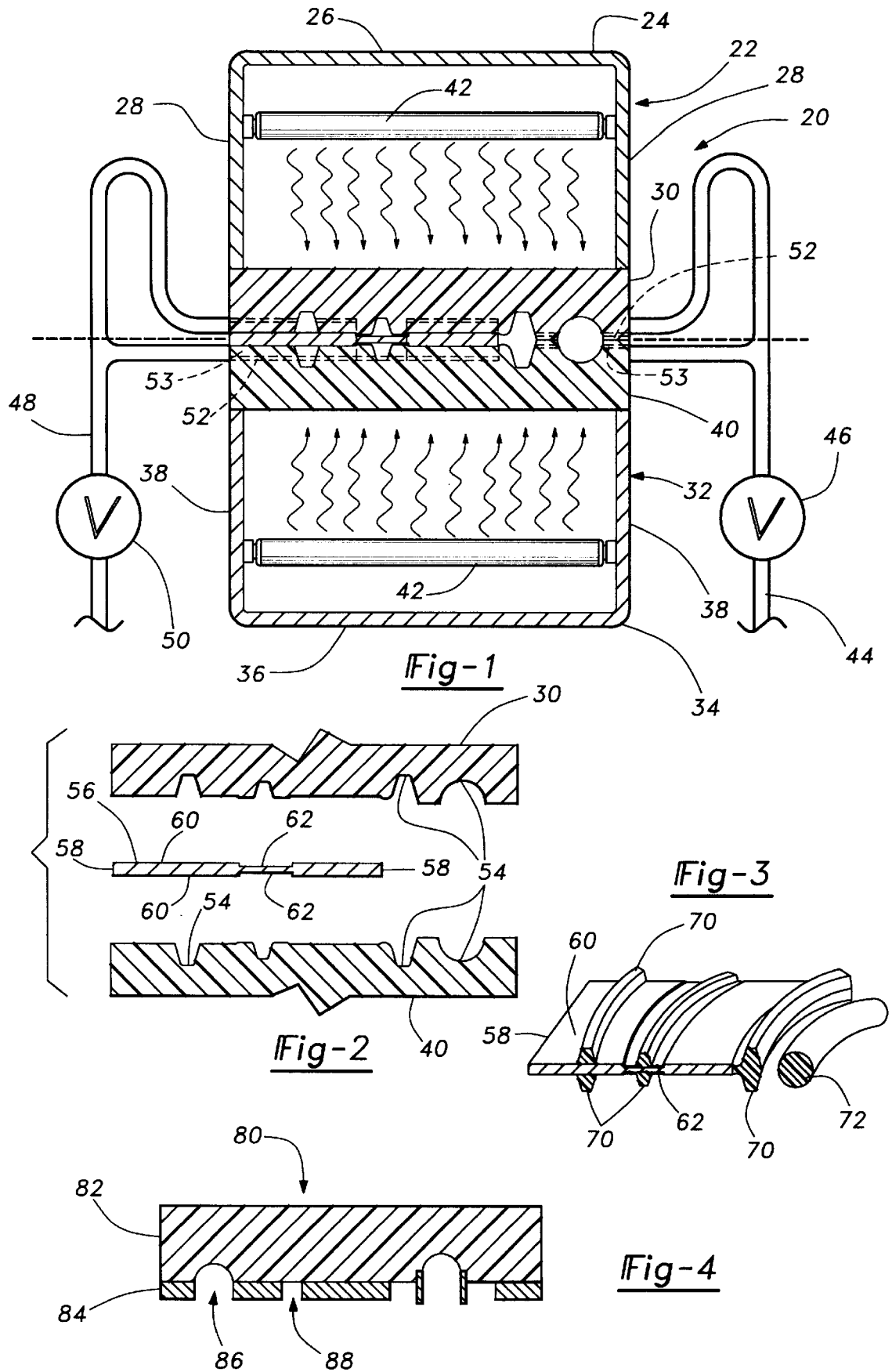

5,885,514

AMBIENT UVL-CURABLE ELASTOMER MOLD APPARATUS

FIELD OF THE INVENTION

The present invention relates generally to the fabrication of an engine cylinder head gasket. More particularly, the invention relates to molding a cylinder head gasket using ultraviolet light, ("UVL"), and UVL-transparent molds to cure an elastomer injected at low pressure and ambient temperature.

BACKGROUND OF THE INVENTION

Gaskets are often used as a seal between mating mechanical components. One common application involves gasket placement between the engine block and cylinder head of an internal combustion engine. Cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing.

To provide improved sealing of rigid gaskets, a resilient material is sometimes applied to a gasket carrier plate. The resilient material can be applied to the gasket to form a covering layer. It may also be in the form of beads of material surrounding the outer perimeter of the gasket and any individual gasket openings such as around a cylinder head opening.

A number of methods are known for applying the resilient material to the gasket carrier plate. These methods include: silk screening (also called screen printing) and high temperature, high pressure injection molding.

After the resilient material is applied to the gasket, it must be cured. The curing process can be accomplished by heating. Known methods of heating include the use of an oven or the high temperature environment of a conventional injection molding machine. It is also known to cure certain types of gasket coatings using ultraviolet radiation. Curing solidifies the resilient material and provides greater adhesion of the coating to the gasket core.

However, the known methods of applying resilient material to a gasket carrier plate are inefficient in terms of prototype development, production costs, and production time. Further, the use of high temperature environments may cause unwanted gasket deformation as well as the generation of pollutants such as solvent fumes.

SUMMARY OF THE INVENTION

The present invention is directed to an UVL-transparent mold and an accompanying molding process for low pressure, room-temperature molding of UVL-curable elastomers.

An injection molding machine includes upper and lower housings having upper and lower mold plates, respectively. The mold plates are designed to allow ultraviolet light to pass through them. Other portions of the housings are UVL opaque.

In operation, the injection molding machine injects UVL-curable elastomer into the UVL-transparent molds using low pressure (approximately 70–150 psi) and ambient temperatures (approximately 60°–120° F./15°–50° C.). Such an approach allows for faster, lower cost injection molding when compared to a typical injection molding machine which requires high pressures (5,000–32,000 psi) and high temperatures (275°–650° F./135°–343°C.) to form parts from elastomers requiring high temperature curing.

Another benefit of the instant invention is the fast, inexpensive prototyping which is made available.

Further, a greater variety of shapes can be produced by injection molding UVL-curable elastomers, when compared to known methods such as screen printing. For instance, injection molding allows a resilient material to be applied in greater thickness onto a carrier plate. Additionally, the present invention produces no scrap and allows both sides of the gasket carrier plate to be coated simultaneously.

BRIEF DESCRIPTION OF THE DRAWINGS

The features and inventive aspects of the present invention will become more apparent upon reading the following detailed description, claims, and drawings, of which the following is a brief description:

FIG. 1 is a sectional view of upper and lower mold plates.

FIG. 2 is a sectional view of a low pressure injection molding machine according to the present invention.

FIG. 3 is a perspective view of parts fabricated according to the present invention.

FIG. 4 is a sectional view of a two-layer composite mold plate.

DETAILED DESCRIPTION OF A PREFERRED EMBODIMENT

FIG. 1 shows an injection molding machine 20 for manufacturing parts using ultraviolet light ("UVL")-curable elastomers. Machine 20 includes an upper mold half 22 and a lower mold half 32. Upper mold half 22 includes a housing 24 having a base 26 disposed between adjacent side walls 28 and an opposing mold plate 30, also disposed between side walls 28. Likewise, lower mold half 32 includes a housing 34 having a base 36 disposed between adjacent side walls 38 and an opposing mold plate 40, also disposed between side walls 38.

Mold plates 30, 40 are made from materials which are transparent to UV light. Any transparent material can be used, especially transparent plastics because of their ease of forming and low cost. By contrast, upper and lower housing bases 26, 36 and side walls 28,38 are UVL-opaque, being made from materials that do not transmit UV light.

Mounted in each of the housings 24, 34, between bases 26, 36 and mold plates 30, 40, is an UV radiation source 42. Each UV source 42 is oriented to emit UV light energy toward its respective mold plate 30, 40 so as to effect curing of an injected material, such as an elastomer.

To inject the material into the upper and lower mold plates 30, 40 an inlet hose 44 having an inlet valve 46 is used in combination with an outlet hose 48, an outlet valve 50 and a vacuum pump (not shown). The elastomer travels through injection channels 52 located in mold plates 30,40. Injection channels 52 are UVL opaque, like the housing bases 26, 36 and side walls 28, 38. A preferred method to make channels 52 opaque is to paint an opaque material 53 onto the surface of injection channels 52. It is also envisaged to cover the surface of injection channels 52 with a layer of thin opaque material 53 such as metal foil or a thin plastic sheet.

FIG. 2 shows a cross-section of opposing upper and lower mold plates 30, 40. Recesses 54 of predetermined size and predetermined spaced apart locations are provided in the mold plates 30, 40 to form a pattern for the elastomer to fill, thus creating a design for the finished product. Additionally, FIG. 2 shows a carrier plate 56 having ends 58 and upper and lower surfaces 60 with opposing grooves 62 located on surfaces 60 at predetermined locations and having predetermined sizes. Carrier plate 56 is positioned between the mold plates 30, 40 and selectively covers one or more of the recesses 54. The carrier plate 56 is a part of the gasket and provides a rigid surface upon which the injected material can adhere. The injected material is molded to carrier plate 56 to form sealing rings 70 and can be any type of UVL-curable material including liquids or gels. Preferably, silicones are used because they are UVL-curable and have good flow characteristics at ambient temperature and low pressure. Silicones also have good resistance to heat which is a desired characteristic for use in an engine environment. Any material having similar properties can be used.

FIG. 3 shows a partial cross-sectional view of an engine gasket having multiple sealing rings 70 attached to carrier plate 56. Thickness of rings 70 are in the range of approximately 0.02–0.05 inch (0.50–1.30 mm). Sealing rings 70 are selectively molded to end 58, groove 62 or surface 60. A separate ring 72 is also shown. However, ring 72 can be produced either simultaneously with and in the same mold as carrier plate 56 or formed separately.

FIG. 4 shows a cross-section of another mold plate 80, according to a different embodiment. Mold plate 80 is constructed of a transparent layer 82 and an opaque layer or shim 84. The transparent layer 82 is preferably plastic and transparent to UV light. The opaque layer 84 is preferably metal and has a pattern cut-out which allows the passage of UV light through the portions where metal has been fully removed. In this embodiment, it is possible to form the injection channels in the opaque layer or shim 84 by forming channels that are shallower than the thickness of layer or shim 84. Mold plate 80 allows pattern shapes to be formed in both layers 82 and 84 as indicated by arrow 86 or only in opaque layer 84 as indicated at arrow 88. In addition, opaque layer or shim 84 is used to increase mold life by providing stronger material at mold surfaces that are subject to high wear. Those skilled in the art will recognize that opaque layer 84 can be applied to any surface of the mold plate so long as UV light is transmitted for curing in the desired locations.

Through the use of a computer controlled laser device, the process of making the pattern cut-out in layer 84 may be expedited which is particularly useful when making prototype gaskets.

OPERATION

The following discussion details the operation of injection molding machine 20.

First, molding machine 20 is opened, allowing a carrier plate 56 to be positioned between the upper and lower mold plates 30, 40. Next, the molding machine is closed, sandwiching the carrier plate 56 between the upper and lower mold plates 30, 40. Thereafter, a UVL-curable elastomer is injected into the mold at low pressure (approximately 5 to 10 atmospheres or 70–150 psi) and at ambient temperature (approximately 60°–120° F. or 15°–50° C.). The injection step is accomplished by opening the inlet and outlet valves 46, 50. The elastomer flows from a pressurized container through injection channels 52 which have surfaces 53 that prevent passage of UV light, as discussed above. The mold recesses 54 are filled with uncured elastomer as a vacuum pump draws air, and eventually uncured elastomer, out through the outlet hose 48 and outlet valve 50. Once recesses 54 are filled with uncured elastomer, both valves 46 and 50 are closed. Next, UV radiation sources 42 are activated. Irradiation with UV light passes through the UVL-transparent mold plates 30, 40 to cure the elastomer. The curing process takes approximately 10 to 20 seconds. Finally, the molding machine is opened and the completed part is removed. After removal, the machine is ready to mold another part by repeating the above cycle.

A variety of parts, other than engine gaskets, may be readily fabricated using the inventive molding system. Possible parts include seals, 0-rings, or any other readily molded parts. Thus, the disclosed embodiments and examples are given to illustrate the present invention. However, they are not meant to limit the scope and spirit of the present invention. Therefore, the present invention should be limited only by the appended claims.

What is claimed is:

1. A method of forming a gasket comprising the steps of:
   providing at least one upper gasket mold plate that is transparent to ultraviolet radiation;
   providing at least one lower gasket mold plate in opposing relation to said upper mold plate wherein said lower mold plate is transparent to ultraviolet radiation;
   providing at least one injection channel in one of said upper and lower mold plates, said injection channel being opaque to ultraviolet radiation;
   providing at least one UV radiation source for directing UV radiation toward said mold plates;
   injecting elastomeric material between said upper and said lower mold plates to form a gasket element; and
   irradiating said elastomeric material by activating said UV radiation source,
   wherein said UV radiation passes through said upper and lower mold plates where said upper and lower mold plates are transparent and does not pass through said opaque injection channel, thereby effecting curing of said elastomeric material where said upper and lower mold plates are transparent.

2. The method of claim 1 further comprising the step of:
   positioning a gasket carrier plate between the upper and lower mold plates for attachment to said elastomeric material.

3. The method of claim 1 further comprising the step of:
   providing predetermined, spaced apart recesses in at least one of said mold plates, said recesses having different sizes.

4. The method of claim 1 further comprising the step of:
   providing two radiation sources, located on opposing sides of said mold plates.

5. The method of claim 1 further comprising the step of:
   selecting ambient temperature as an operating temperature for the elastomeric material, the upper mold plate and the lower mold plate.

6. The method of claim 1 further comprising the steps of:
   selecting an injection pressure of approximately 5–10 atmospheres; and
   selecting a curing time of approximately 10–20 seconds.

7. A method of forming a gasket comprising the steps of:
   providing at least one gasket mold plate that is transparent to UV radiation at preselected locations and opaque to UV radiation at other locations;
   forming a plurality of recesses having predetermined sizes at spaced apart locations in said mold plate that correspond with said preselected locations;
   positioning a gasket carrier plate over said mold plate so as to selectively cover a predetermined number of said recesses;
   injecting an elastomer between said gasket carrier plate and said mold plate to form gasket elements on said gasket carrier plate; and irradiating said elastomer by activating a UV radiation source, wherein said UV radiation passes through said preselected locations and does not pass through said opaque locations, thereby effecting curing of said elastomer in said preselected locations.

8. The method of claim 7 further comprising the step of:

providing a second gasket mold plate located opposite to said at least one mold plate, said second mold plate being transparent to UV radiation at preselected locations.

9. The method of claim 7 wherein said carrier plate covers all of said recesses.

10. The method of claim 7 wherein said elastomer is injected at ambient temperature.

11. The method of claim 8 further comprising the step of:

selecting an injection pressure of approximately 5–10 atmospheres.

12. The method of claim 8 further comprising the step of:

selecting a curing time of approximately 10–20 seconds.

13. The method of claim 3 wherein the step of providing at least one injection channel is providing a plurality of injection channels leading to said recesses such that said injection channels are opaque to ultraviolet radiation.

14. The method of claim 2 further comprising the step of:

forming a separate sealing element by positioning said carrier plate to cover less than all of said recesses.

15. The method of claim 1 further comprising the step of:

providing a plurality of spaced apart recesses on both said upper and lower mold plates such that each recess in said upper mold plate is aligned with a corresponding, opposing recess, in said lower mold plate.

16. The method of claim 1 wherein the step of providing at least one upper mold plate further comprises providing a generally transparent layer connected to a generally opaque layer, said opaque layer having a pattern cut-out that allows passage of ultraviolet light through said transparent layer.

17. The method of claim 7 further comprising the step of:

forming a separate sealing element by positioning said carrier plate to cover less than all of said recesses.

18. The method of claim 7 further comprising forming injection channels leading to said recesses such that said injection channels are opaque to ultraviolet radiation.

19. A method of forming a gasket comprising the steps of:

providing at least one upper gasket mold plate having a transparent layer connected to a opaque layer, said opaque layer having a first pattern cut-out to allow passage of ultraviolet radiation through said upper mold plate;

providing at least one lower gasket mold plate in opposing relation to said upper mold plate wherein said lower mold plate has a transparent layer and a opaque layer, said opaque layer having a second pattern cut-out to permit passage of ultraviolet light through said lower mold plate;

providing at least one injection channel in said lower mold plate by forming channels in said opaque layer that are shallower than an overall thickness of said opaque layer to prevent passage of ultraviolet radiation;

providing a least one UV radiation source for directing UV radiation toward said mold plate;

injecting elastomeric material between said upper and said lower mold plates to form a gasket element; and irradiating said elastomeric material by activating said UV radiation source wherein said UV radiation passes through said first pattern cut-out of said upper mold plate and does not pass through said opaque layer of said upper mold plate, thereby effecting curing of said elastomeric material in said first pattern cut-out.

* * * * *